US009113618B2

(12) United States Patent
Gravelle et al.

(10) Patent No.: US 9,113,618 B2
(45) Date of Patent: Aug. 25, 2015

(54) MATERIAL APPLICATION TO FISHING LURES POSSESSING TEMPERATURE SENSITIVE CHROMATICITY VICISSITUDE CREATING A COLOR CHANGING FISHING LURE OR RUBBER BAIT

(75) Inventors: Gerald Gravelle, Hamilton (CA); Daniel Nossey, Hamilton (CA)

(73) Assignee: 2028631 ONTARIO INC., Ontario (CA)

( * ) Notice: Subject to any disclaimer, the term of this patent is extended or adjusted under 35 U.S.C. 154(b) by 0 days.

(21) Appl. No.: 13/316,417

(22) Filed: Dec. 9, 2011

(65) Prior Publication Data
US 2013/0333272 A1 Dec. 19, 2013

Related U.S. Application Data

(60) Provisional application No. 61/422,152, filed on Dec. 11, 2010.

(51) Int. Cl.
*A01K 85/00* (2006.01)
*A01K 85/01* (2006.01)

(52) U.S. Cl.
CPC ............... *A01K 85/00* (2013.01); *A01K 85/01* (2013.01)

(58) Field of Classification Search
CPC .............................. A01K 85/00; A01K 85/01
USPC .............. 43/2, 3, 42.32, 42.33, 42.34, 42; 446/236, 247, 248, 249; 472/7
See application file for complete search history.

(56) References Cited

U.S. PATENT DOCUMENTS

| 2,333,484 | A | * | 11/1943 | Miles | 43/42.33 |
| 3,631,625 | A | * | 1/1972 | Castner | 43/42.33 |
| 3,763,588 | A | * | 10/1973 | Foster | 43/4 |
| 3,935,659 | A | * | 2/1976 | McCallum | 43/17.6 |
| 4,676,020 | A | * | 6/1987 | Taylor et al. | 43/42.02 |
| 4,731,948 | A | * | 3/1988 | Helton | 43/42.33 |
| 4,787,167 | A | * | 11/1988 | Wroclawski | 43/17.6 |
| 4,835,899 | A | * | 6/1989 | Helton | 43/42.33 |

(Continued)

FOREIGN PATENT DOCUMENTS

| JP | 11113451 A | * | 4/1999 | A01K 85/00 |
| JP | 2001327231 A | * | 11/2001 | A01K 85/00 |

OTHER PUBLICATIONS

Bass Pro Shop ®. <basspro.com>. Jul. 7, 2009.*

*Primary Examiner* — Rob Swiatek
*Assistant Examiner* — Morgan T. Barlow
(74) *Attorney, Agent, or Firm* — Jason H. Vick; Sheridan Ross, PC

(57) ABSTRACT

A process where materials are applied to a plastic fishing lure surface, producing a lure that possesses chromatic vicissitude as a result of water temperature fluctuations. A non-thermochromatic base layer of one or more colors is applied to the plastic fishing lure. This layer acts as the visual appearance of the fishing lure in the absence of temperature fluctuations. Clear extender is then used as an additive to the thermochromatic ink. This addition to the ink then allows the ink to be sprayed onto the surface of the lure. This ink-extender amalgam can be applied in multiple layers however the bottom layer must have the least amount of hue saturation. Each layer thereafter would increase in hue saturation. Multiple hue combinations can be utilized. Once the desired number of thermochromatic layers has been applied, an ultra-clear super high gloss lacquer finish is sprayed on to the exterior of all layers.

19 Claims, 1 Drawing Sheet

(56) References Cited

U.S. PATENT DOCUMENTS

| | | | |
|---|---|---|---|
| 4,917,643 A * | 4/1990 | Hippely et al. | 446/14 |
| 5,222,320 A * | 6/1993 | Erickson | 43/42.32 |
| 5,381,620 A * | 1/1995 | Gibbs | 43/42.09 |
| 5,465,524 A * | 11/1995 | Vallone et al. | 43/42.32 |
| 5,564,220 A * | 10/1996 | Blicha | 43/42.32 |
| 6,318,020 B1 * | 11/2001 | Mefferd | 43/42.32 |
| 6,560,914 B2 * | 5/2003 | Kruger | 43/42 |
| 6,578,313 B1 * | 6/2003 | Knol | 43/42.47 |
| 8,173,116 B1 * | 5/2012 | Buzzi | 424/84 |
| 8,490,321 B1 * | 7/2013 | Butz | 43/42.53 |
| 2002/0178643 A1 * | 12/2002 | Brodeur | 43/42 |
| 2004/0000086 A1 * | 1/2004 | Wetherington et al. | 43/42.24 |
| 2007/0220798 A1 * | 9/2007 | Davidson | 43/4 |
| 2008/0163539 A1 * | 7/2008 | Choi | 43/42.34 |
| 2010/0293833 A1 * | 11/2010 | Bossone, III | 43/17.6 |
| 2012/0304523 A1 * | 12/2012 | Haldin | 43/42 |
| 2013/0239457 A1 * | 9/2013 | Corbitt et al. | 43/42 |

* cited by examiner

MATERIAL APPLICATION TO FISHING LURES POSSESSING TEMPERATURE SENSITIVE CHROMATICITY VICISSITUDE CREATING A COLOR CHANGING FISHING LURE OR RUBBER BAIT

RELATED APPLICATION DATA

This application claims the benefit of and priority under 35 U.S.C. §119(e) to U.S. Patent Application No. 61/422,152, filed Dec. 11, 2010, entitled "Material Application to Fishing Lures Possessing Temperature Sensitive Chromaticity Vicissitude Creating a Color Changing Fishing Lure or Rubber Bait," which is incorporated herein by reference in its entirety.

SUMMARY

This invention relates to the unique process by which a thermochromatic ink is applied the surface of a plastic fishing lure.

A process where materials are applied to a plastic fishing lure surface is performed, producing a lure that possesses chromatic vicissitude as a result of water temperature fluctuations. A non-thermochromatic base layer of one or more colors is applied to the plastic fishing lure. This layer acts as the visual appearance of the fishing lure in the absence of temperature fluctuations. Clear extender is then used as an additive to the thermochromatic ink. This addition to the ink then allows the ink to be sprayed onto the surface of the lure. This ink-extender amalgam can be applied in multiple layers however the bottom layer must have the least amount of hue saturation. Each layer thereafter would increase in hue saturation. Multiple hue combinations can be utilized. Once the desired number of thermochromatic layers has been applied, an ultra-clear super high gloss lacquer finish is sprayed on to the exterior of all layers.

The employment of thermochromatic inks to produce color or changing effects has been previously utilized on fishing lures. These previous uses however, have employed the application to the entirety of the lure. The result of this previous application is blocks of color. As it is commonly understood, fishing lures are designed with the purpose of resembling and moving like the prey of a fish. As the prey of fish never appears in nature as blocks of color, this is problematic for the fisherman who is attempting to employ lures that have the maximum degree of authenticity.

This particular process however, enables application in a manner that produces a gradient effect in addition to the chromatic vicissitude; that is more like that seen in nature, ergo, more life-like. Thermochromatic inks cannot be sprayed onto to a surface without the addition of a thinning agent due to its thick viscosity. It would stand to reason then that a process that allows the ink to be sprayed on in a gradient pattern, versus a solid, achieves a more accurately realistic finish. This results in attaining the design objectives of a fishing lure with exactitude and realism. Aspects of the invention are directed toward:

1. A plastic fishing lure having materials applied to it in such a manner that result in temperature sensitive chromatic vicissitude and design required exactitude and realism.
2. The fishing lure of aspect 1, wherein a base or 'primer' layer of non-thermochromatic coating is applied to the plastic body of the fishing lure in preparation for the application and bonding of a thermochromatic ink layer.
3. The thermochromatic ink of aspect 2 is mixed with a clear extender resulting in an ink-extender amalgam.
4. The ink-extender amalgam of aspect 3 is then applied to the fishing lure of claim 1 in a sprayed on gradient on top of the bonding layer of claim 2. This layer enables thermochromatic sensitivity to water temperature variations and provides the optic achievement of fish prey realism.
5. The ink-extender amalgam of aspect 3 is applied in one or more layers with the bottom layer being of least amount of hue saturation and each additional layer increasing with hue saturation. Each layer possessing a different temperature sensitivity.
6. Upon completion of the layers of aspect 5, the fishing lure of claim 1 has a final layer of ultra clear super high gloss lacquer finish sprayed upon it.

DETAILED DESCRIPTION

Figure 1:
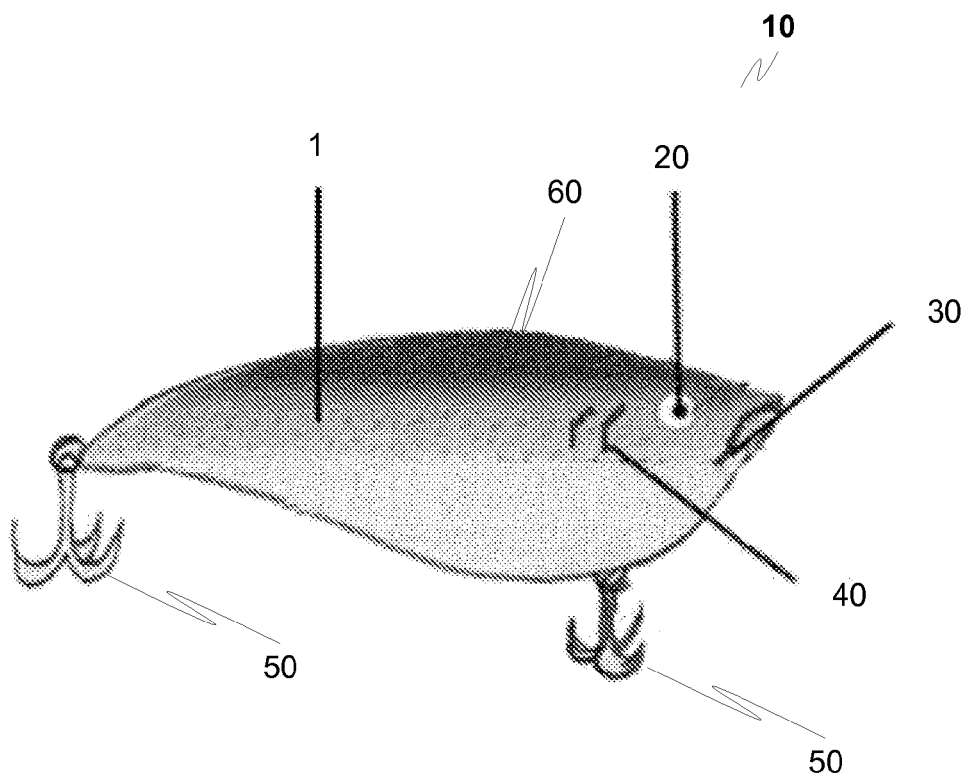
FIG. 1 illustrates an exemplary fishing lure in accordance with an aspect of the invention.

FIG. 1 shows an illustration of a standard fishing lure that will be spray coated with multiple layers of thermochromatic ink-extender amalgam and a single base layer of non-thermochromatic coating. Although standard fishing lures come in various sizes, shapes, and hardness, they will be coated with similar gradient patterns and designs.

FIG. 1 shows an exemplary fishing lure 10. The fishing lure 10 includes an upper body 1. The exemplary fishing lure includes eyes 20, mouth lines 30, gill lines 40, fins and scale markings and one or more hooks 50.

The upper body 1 of the top portion 60 of the fishing lure 10 will be coated with a thermochromatic ink-extender amalgam in a gradient pattern. The gradient pattern will start solid and will fade in opacity as the coating traverses the body of the lure. The gradient effect will stop halfway to two-thirds of the way down the body of the lure. The gradient effect on the lure will consist of multiple layers of thermochromatic ink-extender amalgam and one non-thermochromatic layer of different colors. The layering of the gradient pattern will allow the lure to possess color changing properties in response to water temperature changes.

Further details will be added to the standard lure such as the eyes 20, mouth lines 30, gill lines 40, fins and scale markings, etc., using non-thermochromatic ink for a more realistic effect. Using these details on the lure 10, in addition to the color changing gradient effect, will allow the lure to resemble actual prey to predator fish.

Figure 2:
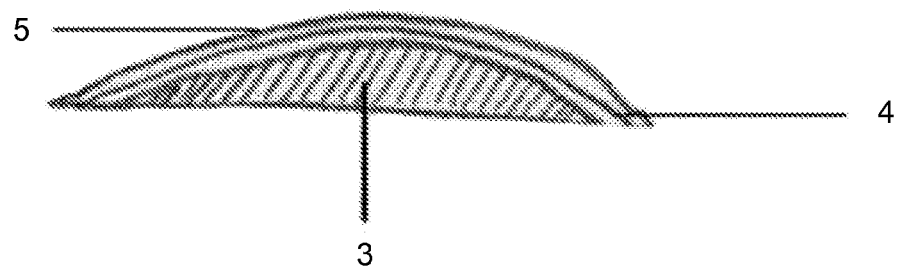
FIG. 2 illustrates a cross-section of a surface of the fishing lure coated with one base layer of non-thermochromatic ink and multiple layers of thermochromatic ink of different colors.

FIG. 2 illustrates a cross section of the surface of a standard fishing lure coated with one base layer of non-thermochromatic ink and multiple layers of thermochromatic ink of different colors.

Label 3 shows a cross section of the bottom layer of the top portion of a standard fishing lure. This layer will be coated with a layer of non-thermochromatic ink and will be the base layer of the fishing lure.

Label 4 shows a layer of thermochromatic ink-extender amalgam on top of the base layer 3 that will be transparent or solid depending on the temperature of the water. If this ink-extender amalgam layer is in the transparent state then it will expose the base non-thermochromatic layer. If this layer is in the solid state then it will cover the base non-thermochromatic layer.

Label 5 shows a layer of thermochromatic ink-extender amalgam on top of another ink-extender amalgam layer that will be transparent or solid depending upon the temperature of the water. If this amalgam layer is in the transparent state, then it will expose the underlying amalgam layer. If this layer is in the solid state, then it will cover the underlying amalgam layer. Each thermochromatic-extender layer will react at a different temperature than the previous or underlying thermochromatic-extender layer.

The invention claimed is:

1. A device comprising:
   a fishing lure comprising a body;
   the body comprising a base layer of non-thermochromatic ink;
   a first ink layer provided over the base layer, the first ink layer comprising a first thermochromatic ink and the first thermochromatic ink provided in a gradient pattern wherein the first thermochromatic ink fades in opacity as the first thermochromatic ink traverses the body, and wherein the thermochromatic ink is provided on a portion of the body and a remainder of the body comprises a non-thermochromatic ink; and
   one or more of eyes, mouth lines, gill lines and fin and scale markings comprising non-thermochromatic ink; and
   wherein the thermochromatic ink comprises a transparent ink at a first temperature, and wherein the thermochromatic ink reveals a second ink layer at said first temperature.

2. The device of claim 1, wherein the second ink layer comprises the base layer.

3. The device of claim 1, wherein the thermochromatic ink is mixed with a clear extender resulting in an ink-extender amalgam.

4. The device of claim 1, further comprising a third ink layer comprising a thermochromatic ink.

5. The device of claim 4, wherein a bottom layer is of a least amount of hue saturation and each additional layer increases with hue saturation, and each layer possesses a different temperature sensitivity.

6. The device of claim 1, further comprising a top layer of ultra clear super high gloss lacquer finish.

7. The device of claim 1, further comprising one or more hooks.

8. The device of claim 1, wherein the gradient pattern stops one or more of halfway to two-thirds of a way down the body of the lure.

9. The device of claim 1, wherein a base layer of the fishing lure consists of non-thermochromatic ink.

10. The device of claim 9, wherein a portion of the base layer is visible depending on whether the first ink layer is solid or transparent.

11. The device of claim 1, wherein each ink layer reacts at a different temperature.

12. The device of claim 1, wherein each ink layer reacts at a different temperature than an underlying ink layer.

13. The device of claim 1, wherein at least one of the first and second ink layers is transparent.

14. The device of claim 1, wherein at least one of the first and second ink layers is opaque.

15. The device of claim 1, wherein the base layer provides a visual appearance of the fishing lure in an absence of temperature fluctuations.

16. The device of claim 1, wherein each ink layer has a different hue saturation.

17. A fishing lure comprising:
    a body;
    a base layer provided over the body, the base layer comprising a non-thermochromatic ink of a first color;
    a plurality of thermochromatic ink layers provided on the base layer, each of the plurality of thermochromatic ink layers being of a different color than the base layer;
    at least one of the plurality of thermochromatic ink layers provided in a gradient pattern, the gradient pattern comprising a transition in opacity along the body and wherein a first thermochromatic ink layer extends over a portion of the body such that only a portion of the first thermochromatic ink layer comprises a color changing effect in response to temperature change; and
    one or more of eyes, mouth lines, gill lines and fin and scale markings in non-thermochromatic ink.

18. The device of claim 17, wherein the gradient pattern stops one or more of halfway to two-thirds of a way down the body of the lure.

19. The device of claim 18, wherein a portion of the base layer is visible depending on whether the thermochromatic ink layers are solid or transparent.

* * * * *